Oct. 14, 1941.  M. E. HANSEN  2,259,161
DEPOSITION BELT AND METHOD OF MAKING THE SAME
Filed April 2, 1940
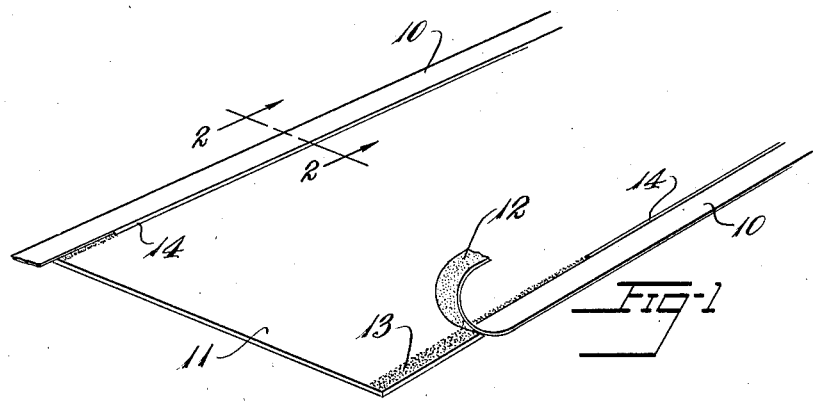
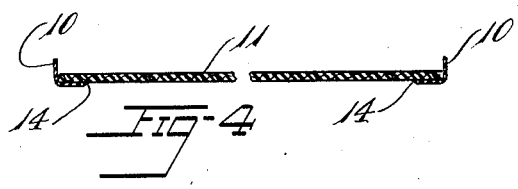
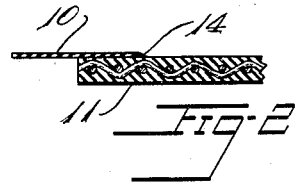
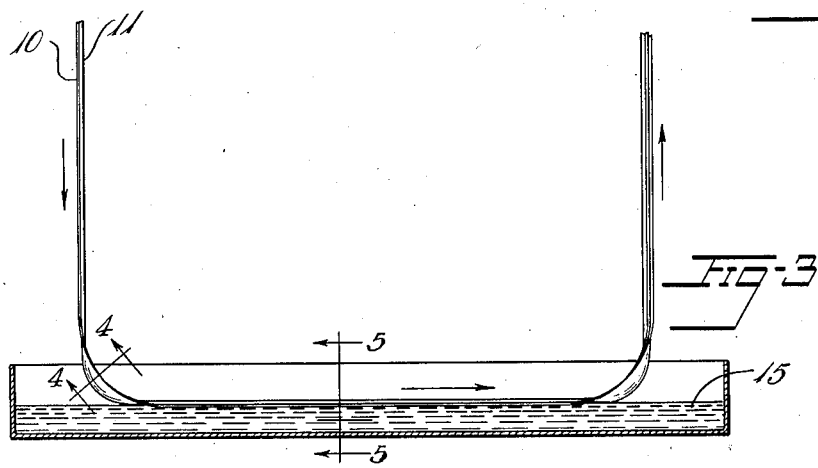
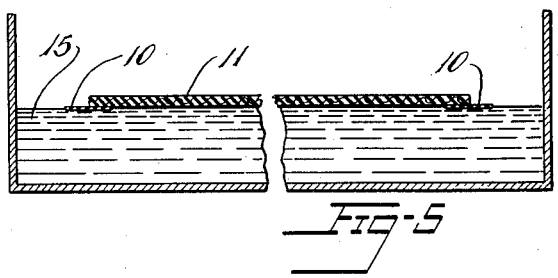
Inventor
Merrill E. Hansen
By Willis F. Avery
Atty.

Patented Oct. 14, 1941

2,259,161

UNITED STATES PATENT OFFICE 2,259,161

DEPOSITION BELT AND METHOD OF MAKING THE SAME

Merrill E. Hansen, Akron, Ohio, assignor to American Anode Inc., Akron, Ohio, a corporation of Delaware Application April 2, 1940, Serial No. 327,443

7 Claims. (Cl. 18—15)

This invention relates to the preparation of an improved floatable deposition belt for use in the continuous manufacture of long lengths of rubber sheeting from latex or analogous dispersions.

In my U. S. Patent No. 2,147,293, granted February 14, 1939, and in my copending patent application, Serial No. 247,044, filed December 21, 1938, which now has matured into U. S. Patent No. 2,241,814, granted May 13, 1941, I have described and claimed a method and apparatus in which a sheet deposition base is caused to travel in a path including a free loop and the bottom of the free loop is maintained in progressive floating contact with the surface of a body of liquid rubber latex to receive a coating of latex rubber. The coating of latex rubber may be dried and stripped from the base in the form of a continuous sheet or strip of rubber. The present application is directed primarily to a particular, improved sheet deposition belt designed to better carry the principles of the aforesaid inventions into efficient and economical commercial use, particularly in the manufacture of rubber sheeting. Although any of several types of floatable deposition bases or belts may be used in the manufacture of rubber sheeting by the above method this invention is concerned with a belt that exhibits certain desired characteristics and that produces an improved sheet of rubber.

In making wide sheets of rubber it is necessary to use a deposition belt that will not stretch during the manufacturing operation. The most practical and satisfactory deposition base has been found to be a rubber covered fabric belt. As it is necessary that the edges of these deposition belts be trimmed to provide a smooth edging, fibers or threads in the fabric are exposed and tend to become frayed. In the manufacturing operation these frayed edges become covered with the latex or similar dispersion and make it extremely difficult to strip the deposited rubber sheet from the deposition belt without tearing the sheet. In addition, these frayed edges absorb coagulent and become stiff, making the belt difficult to handle and preventing it from lying smoothly over the surface of the latex. There is also an additional difficulty in that upon first contacting or leaving the surface of the latex the edges of the deposition belt tend to dip beneath the surface and thereby deposit latex rubber on the top surface of the deposition belt. All these tendencies serve to increase the difficulty of obtaining a smooth even coating of latex rubber capable of being easily stripped from the base. It is therefore the object of this invention to provide a superior deposition belt more ideally suited for the manufacture of superior sheet rubber. With this new deposition base belt there is a minimum of trouble encountered in stripping the latex rubber sheet from the deposition base as there is no rubber deposited on the top side of the belt and no adhesion of the latex rubber to the edges of the belt. The operation of depositing latex rubber therefore becomes continuous, efficient and produces a high quality rubber sheet of uniform thickness.

To make the improved deposition base belt which is the subject of this invention I preferably take an ordinary rubber covered fabric belt and affix thereon a strip of rubber tape along each edge so that the rubber tape extends a substantial distance beyond the edge of the belt, the rubber tape preferably being under substantial tension for reasons hereinafter indicated.

The operations in the manufacture of the improved deposition belt will be described in considerable detail with reference to the accompanying drawing, of which Fig. 1 is a fragmentary perspective view of a deposition belt embodying the invention in the course of manufacture;

Fig. 2 is a cross-section taken on line 2—2 of Fig. 1;

Fig. 3 is a sectional diagrammatic elevation showing the deposition belt floating on the surface of a bath of latex, or similar rubber dispersion;

Fig. 4 is a cross-section of the deposition belt taken along the line 4—4 of Fig. 3;

Fig. 5 is a broken cross-section of the deposition base in floating contact with a body of latex, taken along line 5—5 of Fig. 3.

The drawing illustrates one method of making the improved deposition base belt of this invention and the performance of the belt while in service. The invention in a preferred embodiment involves joining a relatively thin rubber tape 10 under tension along each edge of a rubber-covered fabric belt 11, preferably by cementing it to the belt. One embodiment is to coat one side of a thin rubber tape, for instance about 0.5 in. wide and about 0.007 in. thick, with latex 12 and allow the latex to dry. Rubber cement 13 is then applied along about ½ in. of the edge of the face of the belt. The cement is allowed to dry to a tacky state and the dried latex covered surface of the tape is pressed onto the cement covered portion of the belt so that approximately ¼ in. of the tape extends beyond the edge of the belt. The rubber tape is applied under stretch sufficient to produce an elongation, say, of 1% to 200%, dependent upon the modulus of elasticity of the rubber tape used, before being pressed into intimate contact with the cement covered portion of the belt. The elongation will usually be between 10% and 15%, however, for all ordinary rubber tapes. The necessarily close contact may be obtained by rolling the adhering tape with a roller. After the thin rubber tape is applied onto the belt, under stretch, with a substantial portion of the tape extending beyond the edge of the belt, the edge of the tape in contact with the belt is finished by applying a thin strip of latex 14, as with a ruling pen, in the corner between the tape and the belt. This latex is dried and, after drying, serves to fill in the right angle between the tape and the surface of the belt, thereby resulting in a smooth deposition surface as well as serving to reinforce the joined surfaces. The surface of the deposition belt to which the rubber strips are affixed is the surface which comes in floating contact with the liquid rubber latex 15 (Fig. 5).

It has been observed that the difficulties encountered in employing the former flat-surfaced deposition belt were, in the main, caused by the belt cutting through the surface of the latex as it first contacted and then as it left the surface of the latex. This invention successfully overcomes that tendency to cut through as the rubber tape along the edges of the deposition belt, being under tension, curl up at the edge (Figs. 3 and 4) to form a trough whenever the belt is folded concavely, such as occurs at the angles where the belt first contacts and then leaves the surface of the latex. At those points where the belt lies flat over the surface of the latex 15 (Fig. 5), which is that area between the two angles, the deposition belt, including the tape, receives a full coating of latex rubber.

The term deposition base or belt as used in the specification and claims includes all temporary flexible bases which may be passed through an apparatus to direct the belt in a path including a free loop, with the bottom of the loop in progressive floating contact with the surface of a body of latex. The invention also contemplates belts with a thin edging applied during the manufacturing of the belt, as well as those belts to which the thin edging is applied in a subsequent operation, as is hereinabove described. As an example of the former, an improved deposition belt is made by attaching an unvulcanized rubber strip to each edge of an unvulcanized rubber-covered fabric belt with the strip curved over when the belt is rolled up. The assembly is then vulcanized in a circular press with the thin edge curved over so that no tension is in the strip while in the roll but tension is present when the belt is flattened out after the vulcanization has been completed.

Similarly, other liquid coating dispersions of natural or synthetic rubber and rubber-like materials such as neoprene and polyisobutylene, and even dispersions of non-rubber-like materials may be employed in conjunction with the deposition base instead of natural rubber latex. All such dispersions may contain added conditioning and compounding ingredients in major or minor proportions. The terms "latex," "rubber," and "aqueous dispersion of rubber," accordingly have been employed in the claims in a generic sense to include all such dispersions and materials.

Having herein disclosed a preferred method of making the improved deposition base belt of this invention, said belt to be used in a machine for manufacturing rubber sheet or strips, it is accordingly intended that the invention be protected broadly as indicated by the spirit and scope of the appended claims.

I claim:

1. The method of making a deposition belt for depositing thereon rubber from an aqueous dispersion of rubber which comprises providing a relatively broad flexible belt and affixing to an edge of said belt a relatively narrow and thin tape of rubber so that the outer edge of the tape extends substantially beyond the outer edge of the belt, the tape being under tension and substantially stretched when affixed to the belt.

2. The method of making a deposition belt for depositing thereon rubber from an aqueous dispersion of rubber which comprises adhering to each edge of the belt a rubber tape approximately ½ inch wide and from 0.005 to 0.025 inch thick with approximately ¼ inch of the tape extending beyond the edge of the belt; the tape being applied under tension and being substantially stretched when affixed to the belt.

3. A deposition belt for depositing rubber thereon from latex comprising a body portion with a narrow and thin rubber tape associated along each edge of the body portion; said tape being under tension and extending substantially beyond the edge of the body portion of the belt.

4. A deposition belt for depositing rubber thereon from latex comprising a relatively wide body portion with a relatively narrow and thin rubber tape associated along each edge of the body portion; said tape being under tension and extending substantially beyond the edge of the body portion of the belt.

5. A deposition belt for depositing rubber thereon from latex comprising a relatively wide body portion and, in adhering relationship along each edge, a strip of rubber tape approximately ½ inch wide and from 0.005 to 0.025 inch thick extending approximately ¼ inch beyond the body portion of the belt.

6. A floatable deposition belt for depositing rubber thereon from latex comprising a relatively thick body portion with a relatively thin and flexible longitudinal edge portion, said belt being so constructed and arranged that the thin edge portion is under tension when the belt is flattened out and will curl inward when the belt is curved.

7. Apparatus comprising, in combination, a floatable deposition belt for depositing thereon rubber from latex, said belt having a relatively thick body portion and relatively thin and flexible longitudinal edge portions normally under tension when the belt is flat, and means for directing said belt in a path including a free loop with the bottom of said loop in progressive floating contact with the surface of a body of latex, the apparatus including the belt being so constructed and arranged that the edge portions of the belt curl upward when the belt is bent in a curve upon contacting and upon leaving the surface of the latex.

MERRILL E. HANSEN.